Figure 1:
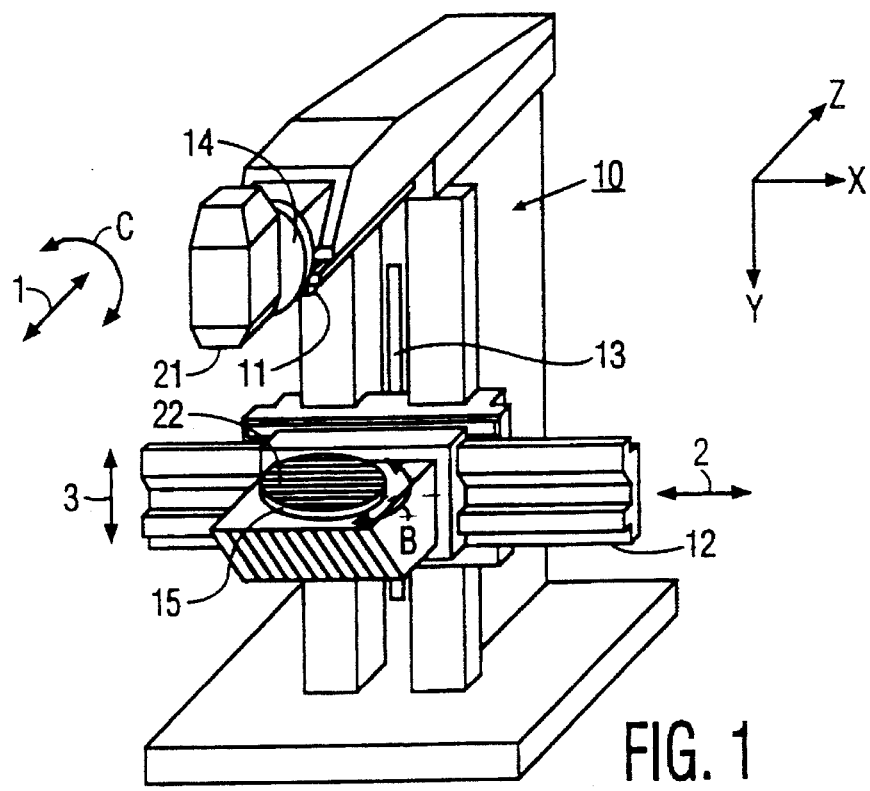

United States Patent [19]

Spaan et al.

[11] Patent Number: 5,492,440
[45] Date of Patent: Feb. 20, 1996

[54] APPARATUS FOR MOVEMENT OF AN OBJECT

[75] Inventors: Henricus A. M. Spaan, Beek en Donk; Johannes A. Soons; Helena M. De Ruiter, both of Eindhoven, all of Netherlands

[73] Assignee: U.S. Philips Corporation, New York, N.Y.

[21] Appl. No.: 235,013

[22] Filed: Apr. 25, 1994

[30] Foreign Application Priority Data

May 18, 1993 [EP] European Pat. Off. .............. 93201425

[51] Int. Cl.⁶ ............................ B23C 9/00; B23Q 15/12; G05B 13/00
[52] U.S. Cl. ..................... 409/80; 318/569; 364/474.35
[58] Field of Search ............................... 409/80, 79, 132, 409/147, 193, 186; 318/569, 567, 560; 364/474.35, 474.28

[56] References Cited

U.S. PATENT DOCUMENTS

| | | | |
|---|---|---|---|
| 3,612,840 | 10/1971 | Stobbe | 318/569 X |
| 4,503,372 | 3/1985 | Nozawa et al. | 318/560 |
| 4,538,098 | 8/1985 | Matsui et al. | 318/567 |
| 4,885,449 | 12/1989 | Suzuki et al. | 219/69.11 |
| 4,893,663 | 1/1990 | Ely | 144/356 |
| 5,021,941 | 6/1991 | Ford et al. | 364/474.35 X |

FOREIGN PATENT DOCUMENTS 0049153  4/1982  European Pat. Off. .
3009393  10/1980  Germany .

OTHER PUBLICATIONS

"Modelling the errors of multi axes machines: a general methodology" by J. A. Soons et al., published in Precision Engineering, vol. 14, No. 1, (1992).
"A General Methodology for Machine Tool Accuracy Enhancement by Error Compensation", by M. A. Donmez et al., published in Precision Engineering, vol. 8, No. 4 (1986), pp. 187–195.
Dissertation of F. Theuws, "Enhancement of Machine Tool Accuracy: Theory and Implementation" (1991), Eindhoven University of Technology.

Primary Examiner—William Briggs
Attorney, Agent, or Firm—Edward Blocker

[57] ABSTRACT

The accuracy of an apparatus for the movement of an object is increased by means of compensating for geometric errors and load and temperature induced deformations. The effects of the errors and deformations are stored in regularly updated compensation tables or parameterisations from which the error values as a function of position are available. The appropriate error values are selected while the complete momentary state of the apparatus can be taken into account. The derived error values can be used to correct the measured position in a feedback loop or to modify the steering signals for driving means without use of a feedback loop.

10 Claims, 3 Drawing Sheets

APPARATUS FOR MOVEMENT OF AN OBJECT

The invention relates to an apparatus for movement of an object comprising a driving mechanism for moving the object in at least one direction, a control unit, coupled to the driving mechanism, for controlling the movement of said object to a target position by repetitively generating steering signals to be applied to the driving mechanism, error compensating means for compensating effects of errors in the driving mechanism which errors cause a deviation between an actual position and the target position. Such an apparatus is, for example, a surface mount machine for the placement of components on a printed circuit board, a numerically controlled milling-machine, a robot, or another type of apparatus which has to perform some movement with high accuracy. The invention also relates to a control unit for controlling such an apparatus. The term driving mechanism is to be interpreted broadly in the framework of the present invention. It encompasses not only a motor or other force generating device but also passive and active components to guide the movement, such as carriages, cross-slides and work-tables. Also the term "target position" is to be interpreted not only as a final position but also as each one of the very many positions on a path that has to be followed accurately.

Such apparatus is known from the Article "A general methodology for machine tool accuracy enhancement by error compensation", by M. A. Donmez et al., published in Precision Engineering, Vol. 8, No. 4 (1986), pages 187–195. In that article it is described to compensate for errors by evaluating them in accordance with a model of the machine, and to inject the error compensation signals into the position servo loop. The error compensation signals are calculated in an external error compensation computer that is attached to the control unit.

The known error compensation has as a drawback that only a restricted amount of information about the state of the apparatus can be transferred to the external computer. Without modifications in the hardware and software of both control unit and error compensation computer a significant number of relevant parameters is not available to the error compensation. These may include important parameters such as tool length and orientation, positioning movement or a refined machining movement. A second important drawback of the known method of error compensation is that it depends on the availability of a position feedback. Therefore, at least a position sensor is required to provide such signals.

It is, inter alia, an object of the invention to provide an apparatus for the movement of an object comprising error compensation, in which the internal parameters of the apparatus are easily accessible and in which position sensors or the like can be dispensed with.

To this end, an apparatus in accordance with the invention is characterised in that the control unit comprises a source from which said effects of said errors in the driving mechanism are available, in that said control unit and said error compensating means are functionally integrated such that the control unit is arranged for accessing said source during each repetition of generating steering signals, or at least a substantial fraction of such repetitions, for obtaining error values indicating the effects of errors and that said effects are taken into account while generating steering signals. As the error compensation is performed at the moment the steering signals are generated, all parameters in the apparatus that have an influence on the steering signals are directly included in a logical way. In other words, in the apparatus according to the invention, while determining the values needed for the compensation of errors in the driving system all parameters that determine the movement of the object are known and can be taken into account. By treating the effects of errors in this way, the use of a position sensor to determine an actual position in the apparatus is not indispensable.

The source for the effects of errors may, for example, comprise information about the linearity of slides and the actual angles between various axes in the apparatus.

In the event the errors may vary over time the apparatus according to the invention can be further characterised in that said source comprises error values indicating the effects of errors in the momentary state of the apparatus, and is arranged for updating these error values at regular intervals. The compensation values are adjusted to time-dependent deformations of the apparatus, for example due to temperature changes. Updating can, for example, occur after roughly fixed time intervals or when the apparatus is at certain predetermined positions. In case of a numerically controlled machining apparatus, it appeared that updating the error values once every 60 seconds was satisfactory to keep up with thermal expansion or contraction.

In an implementation of the apparatus according to the invention said source is included in the control unit and comprises a table in which error values are stored and/or processor means for deriving error values according to a parameterisation. Tables in the control unit allow a fast access with little computational effort. Consequently, the incorporation of error compensation in every cycle of the control unit does not reduce the speed of the machining process, even if the same processor is used for control of the operation of the apparatus and for providing the error compensation. Determining the error values by means of a parameterisation increases accuracy and assures continuity of the error values. The processor for performing the parameterisation may be a dedicated processor, in order to relieve the load on the processor of the control unit.

An embodiment of the apparatus according to the invention is characterised in that it comprises sensor means for determining a state value or a plurality of state values representative of a state of the apparatus and calculation means for deriving from said state value or state values the error values, in accordance with a mathematical model of the apparatus. The state sensors are, for example, temperature and/or load sensors located at suitable places in the apparatus. Depending on the actual design of the apparatus, such sensors may also include position and velocity sensors. By an earlier measurement of the deformation of the apparatus as a function of relevant parameters, a model can be constructed which determines the effects of the various sources of errors, for example mechanical or thermally induced, upon the geometrical behaviour of the apparatus. The results from this model are used to provide the values that represent the effects of the errors and that are available via the source mentioned hereinbefore.

An embodiment of the apparatus according to the invention is characterised in that the control unit comprises position determining means with sensors for measuring the position of the object. The actual position, as determined by position sensors, is fed back to the control unit and used to select the error values that are to be obtained from the source.

An alternative embodiment of the apparatus according to the invention is characterised in that the control unit comprises position determining means arranged for deriving, from the steering signals applied to the driving mechanism, the position of the object.

In this embodiment compensation is performed prior to applying the steering signals to the motor. A separate measurement of the actual position is not necessary.

An apparatus according to the present invention is particularly suitable for an apparatus with a plurality of axes in which the movement or distortion in a single direction or of a single axis may influence the errors that are experienced in other directions or by other axes.

The invention relates also to a control unit for control of an apparatus, the control unit being arranged for controlling the movement of said object to a target position by repetitively generating steering signals to be applied to the driving mechanism, and comprising error compensating means for compensating effects of errors in the driving mechanism which errors cause a deviation between an actual position and the target position. According to the invention such a control unit is characterised in that it comprises a source from which said effects of said errors in the driving mechanism are available, and in that said control unit and said error compensating means are functionally integrated such that the control unit is arranged for accessing said source during each repetition of generating steering signals, or at least a substantial fraction of such repetitions, and that said effects are taken into account while generating steering signals.

These, and other more detailed aspects of the invention will now be elucidated by way of example with reference to the accompanying drawings.

The drawings show in

Figure 2:
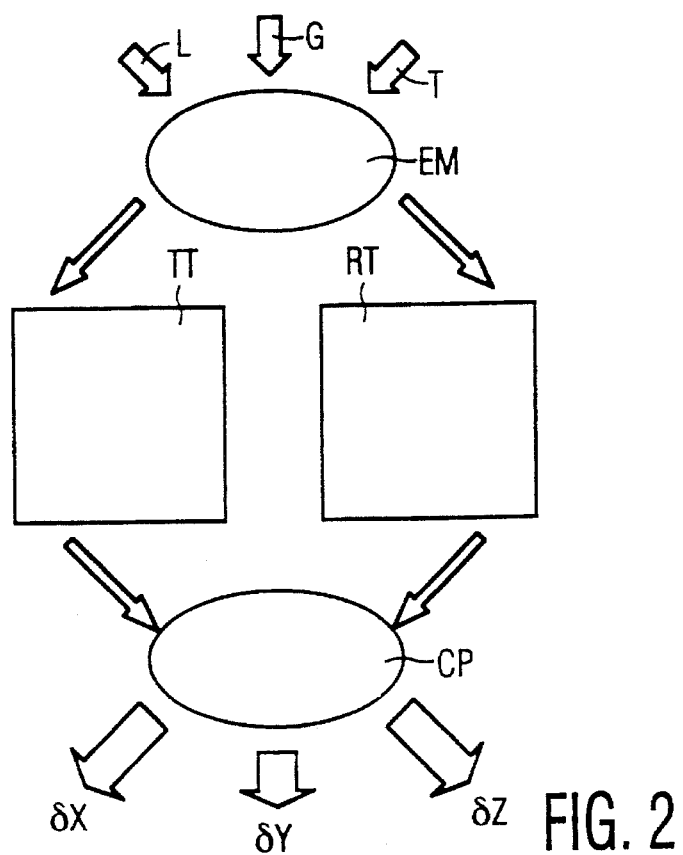
Figure 3:
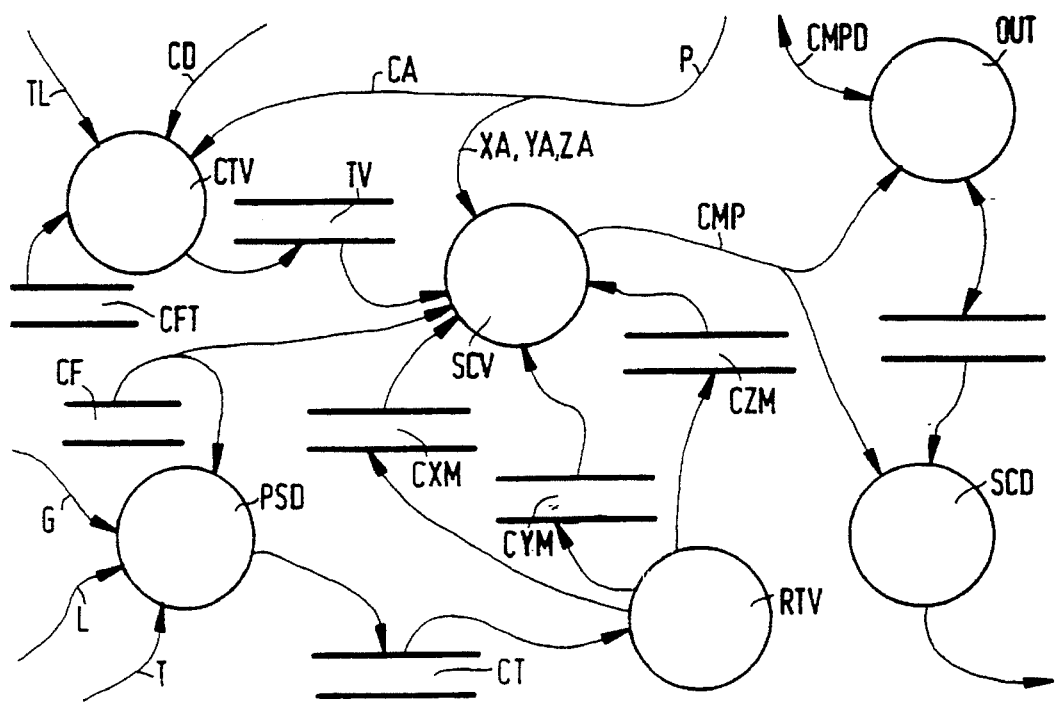
Figure 4:
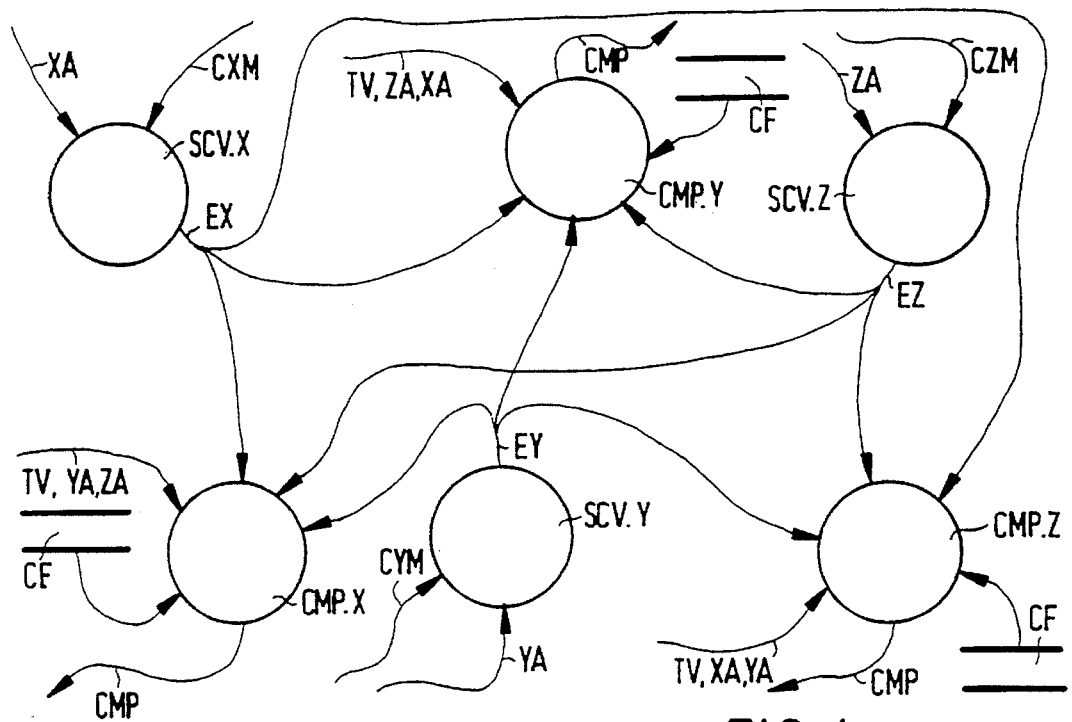

FIG. 1 diagrammatically a milling-machine with three translation and two rotation axes;

FIG. 2 diagram, illustrating by which intermediate steps the errors in x, y and z are derived from the parameters describing a state of the apparatus;

FIG. 3 an illustration of the data flow in an implementation of the present invention;

FIG. 4 portion of FIG. 3 in greater detail; and in

Figure 5A:
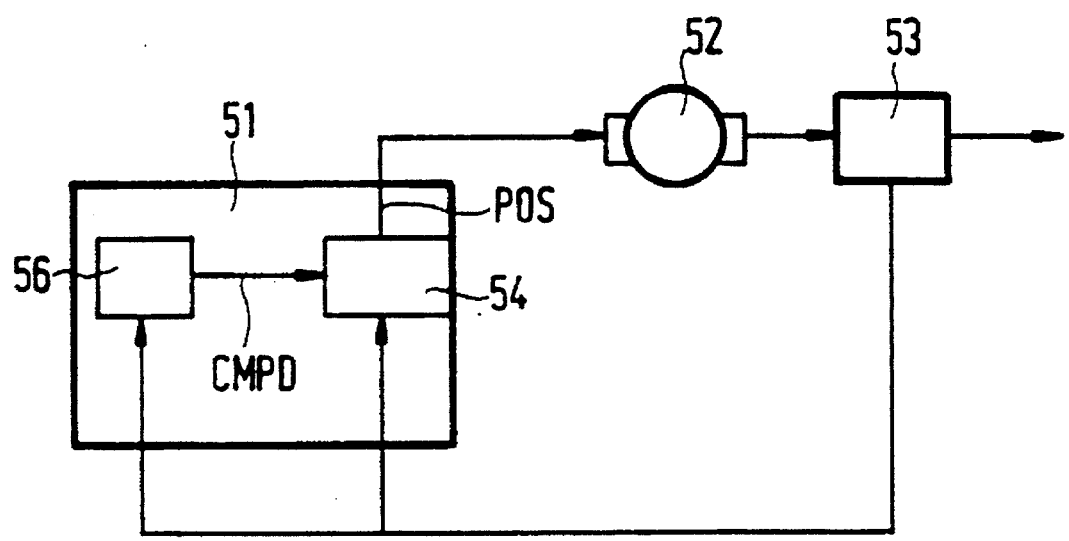
Figure 5B:
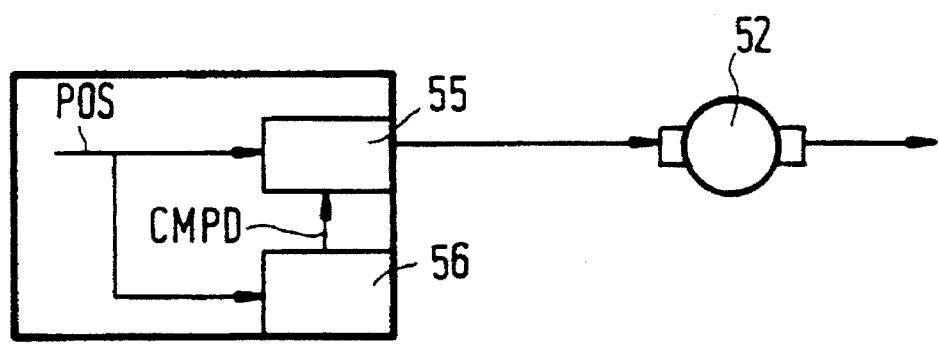

FIGS. 5a and 5b two alternatives in which the present invention can be incorporated in the control system for an apparatus.

The invention is now illustrated by means of reference to a five-axis milling-machine. As such an apparatus has a complicated behaviour with respect to thermal and mechanical load, it experiences most of the errors sources which are relevant for an apparatus according to the invention and, therefore, is very suitable for illustration purposes. However, the invention is not limited to a milling-machining or a lathe and can be applied equally well to other devices in which a accurate movement has to be made, such as apparatuses for injection moulding, placement machines for electronic components, robots, coordinate measuring machines, etc.

In FIG. 1 a diagrammatic lay-out of a five-axis milling-machine 10 is shown. The apparatus comprises three perpendicular axes for relative movement of a toolholder 21 and a workpiece table 12. The directions of the three axes are indicated with double headed arrows 1, for forward-backward movement, 2 for left-right movement and 3 for up-down movement. The linear movements along these axes are normally performed by a carriage guide system, comprising carriages 11, 12 and 13 for the forward-backward, left-right and up-down movements, respectively. In addition a five axis milling-machine comprises two rotary axes with perpendicular axes of rotation 14 and 15, for rotation of the toolholder 21 around forward-backward axis 1 and for rotation of the workpiece table 22 around the vertical axis, as indicated by arrows C and B, respectively. In practice, quite a number of different combinations is used for arranging the axes for movement and rotation of tool and workpiece table. Although the actual arrangement is of influence to the detailed implementation of an error correction according to the present invention, the detailed adaptation of the method to a specific arrangement is within the reach of an ordinary skilled person.

For such an apparatus the relevant error sources which determine the majority of the deviation between the desired positions and the actual positions are:

Geometric errors due to an imperfect shape of the carriage-guide system. These deviations manifest themselves as position and orientation errors between the tool and the workpiece such as a movement in a first direction induces an unintended movement in another direction and/or a rotation around one of the axes. In this respect and for reasons of symmetry, one could even consider a measurement error as to induce an undesired movement in the same direction in which the desired movement occurs. A further source of geometric errors are rotations, which may induce rotations around another axis or even a movement in one of the directions.

Geometric errors due to finite stiffness of the elements of the apparatus. In the case of heavy workpieces or large forces between workpiece and tool a deviation of the position between the tool and the workpiece will result; and Thermal behaviour of the apparatus's structure. Thermal expansion due to several internal (motors, bearings) and external heat sources result in position and orientation errors between the tool and the workpiece of at least the same order of magnitude as the geometrical errors.

A possible method to describe the various geometric errors to the location error of the tool is described in the dissertation of F. Theuws, "Enhancement of machine tool accuracy: Theory and implementation" (1991), Eindhoven University of Technology, and in the Article "Modelling the errors of multi axes machines: a general methodology" by J. A. Soons et al., published in Precision Engineering, Vol. 14, No. 1 (1992). Firstly, the relation between geometric errors and the position of the carriages and with the application of a load on the apparatus and a force between tool and workpiece is to be measured in a reference condition. The measurements can be performed in a conventional way by means of laserinterferometers, levelmeters and displacement transducers. Another possibility to determine the geometric errors comprises the use of the machine as a coordinate measuring apparatus for determining, positions at a reference object. A third method to derive the geometric errors consists of machining a test workpiece or a set of such workpieces which is designed to determine separately the error components. The measured values are used to create an individual model of the apparatus which provides an error vector as a function of the position of all axes, for example, by evaluating a set of polynomials.

Similarly, the effects of thermal deformations of the apparatus are obtained and incorporated in the model. For the purpose of error correction, the matter of interest is not the deformation of each machine component, but the deviation between target and actual positions, for a milling-machine this is the displacement of the tool with respect to the workpiece. The relationship to be determined is this displacement as a function of the temperature deviation from a thermal reference state by means of several temperature sensors attached to the apparatus. For a milling machine the most important internal heat sources are the main drive and the main spindle beatings. This can affect the measurement strategy in that other internal heat sources, such as the drives for the carriages are not taken into account, and that measurements are only performed with various spindle speeds for certain periods of time. More details about the determination of the thermal behaviour of a milling-machine and the development of a model are described in already mentioned the dissertation of F. Theuws, "Enhancement of machine tool accuracy: Theory and implementation" (1991), Eindhoven University of Technology.

In FIG. 2 a diagram is shown of the global lay-out of a correction system according to the invention. The three upper arrows L, G, and T, represent the values of the various error sources load, geometry and temperature, respectively. These values are input to an error model EM, which generates a plurality of tables with error terms. There are eighteen tables to be evaluated, nine tables TT representing the error induced translations in x, y and z directions as a function of the position in each of the directions, and a set of nine tables RT for the error induced rotations. In a practical embodiment for a milling-machine the tables are evaluated and stored into the memory of the control unit once every 60 seconds. The control program CP makes reference to these tables in order to determine the deviations βx, βy and βz to be taken into account in determining the steering signals for the movement.

FIG. 3 shows in more detail the implementation of a real-time error correction system for a milling machine as shown in FIG. 1. In blob PSD the process sensor data are collected. This blob corresponds in function to the upper part of FIG. 2 and comprises the collection of geometric error data G, load sensor signals L and temperature sensor signals T. Together with the configuration data CF the compensation tables CT are determined. The compensation tables CT comprises six tables in which the translations and rotations as functions of x, y and z, respectively are given. The values in the tables can, for example, be derived from functions which are based on the measured values. The portion of the program indicated by the blob RTV reads the tables CT and determines from these the compensation matrices CXM, CYM and CZM indicating compensations as functions of the position along the x, y and z axes respectively.

Alternatively to the use of tables CT to make the compensation values available to the control unit, it is possible to use a parameterisation to determine the translations and rotations that are input to the program sub portion RTV. To relieve the load of the processor in the control unit, a dedicated processor could be used to determine the tables or to calculate the function values resulting from the parameterisation.

The function of blob CTV is to calculate the tool vector TV. This tool vector TV is derived from parameters such as toollength and swivelhead TL, C-axis data CD and the actual position of the C-axis CA. In a milling-machine as shown in FIG. 1, the C-axis is indicated by reference sign 14.

In blob SCV the actual compensation values CMP are derived from the compensation matrices CXM, CYM and CZM, from the toolvector TV and from the actual position P, of which the actual x, y and z positions XA, YA and ZA are input to this portion of the program. The compensation values CMP are used to determine the compensation data CMPD in blob OUT and, if desired, to display the compensation on a screen via a program portion SCD. An interface between the latter two program portions allows further information to be used for display purposes.

The indicated portions of the program need not be repeated equally often. As already mentioned, in an embodiment the calculation of compensation matrices in blobs PSD and RTV occurs once every 60 seconds. The selection of the compensation values and the determination of the compensation data CMPD in blobs SCV and OUT occur every 15 milliseconds, i.e. every time the steering signals for the position determination are generated. The calculation of the tool vector in blob CTV occurs only when the length of the tool, or its orientation changes.

In FIG. 4 the content of the program portion SCV is further shown. There are three input sub portions SCV.X, SCV.Y and SCV.Z and three output sub portions CMP.X, CMP.Y and CMP.Z. The input sub portion CMP.X receives the actual x position XA and has access to the compensation matrix CXM. From these values the errors EX in x, y and z are determined for the present x position XA. These errors are both translation and rotation errors. Analogously, in sub portions SCV.Y and SCV.Z the errors EY and EZ are determined from the actual y and z positions YA and ZA and from the compensation matrices CYM and CZM. In the output sub portion CMP.X the x compensation values are calculated from the error values EX, EY and EZ determined by the input sub portions, from the relevant components of the tool vector TV, the actual position in y and z direction and the relevant part of the configuration dam. The actual y and z positions are necessary as the errors may comprise rotations, a possible rotation around the z-axis as function of the y position gives rise to a displacement in the x-direction and vice versa. The output of this blob CMP.X is part of the determined compensation as is fed into the OUT program portion (FIG. 3). Similarly, the Y and Z compensation data are calculated from the error values EX, EY and EZ, the actual positions XA, YA and ZA, the tool vector TV and the machine configuration CF.

In addition to the above, compensation dosing can be included in the program portion for determining the compensation values. The compensation values CMP are functions of position and time. In the compensation system both are discretised, so spatial and temporal changes of several resolution steps may occur at a time in the compensation values. Without "compensation dosing" this could result in a visible edge in a workpiece. The compensation dosing assures that a compensation of more than one resolution step will be applied with no more than one resolution step per cycle. Herewith, the compensation is smeared out in time or position and a visible edge is avoided.

In the invention the actual position necessary to determine the errors can be derived in two ways. In the first embodiment a feedback loop is present in the control of the apparatus, the compensation values determined in a way as described hereinbefore, are used to correct the position as received from the position sensors in order to obtain the actual position used in the feedback system. Alternatively, the compensation values can be used to modify the steering signals that are supplied to the driving means. The latter method can be used if the response of the driving means is reliable, for example in case the driving means is a stepmotor. The two alternatives are illustrated in FIGS. 5a and 5b. In FIG. 5a a control unit 51 provides steering signals POS for a driving means 52. The response of the driving means is measured in position sensor 53 and fed back to the control unit 51. In a sub portion 56 of the control unit, compensation data CMPD are calculated from signals received from the position sensor and combined with those signals in sub portion 54, used to correct the position signals. FIG. 5b shows a control unit 51 having a sub portion 55 in which position signals POS and compensation data CMPD are combined to provide steering signals for the driving means 52. The compensation data CMPD are calculated from the position signals POS in sub portion 56.

The integration of the error compensation in the control of the apparatus gives rise to a considerable increase in accuracy. The invention has been implemented in a MAHO 700S five-axis milling-machine, using a model as described in the dissertation of F. Theuws, mentioned hereinbefore. The results obtained show an accuracy improvement of 80% for geometric, finite stiffness and thermal errors.

We claim:

1. Apparatus for movement of an object, comprising:
   a) a driving mechanism for moving the object along multi-dimensional axes,
   b) a control unit coupled to the driving mechanism for controlling the movement of said object to a target position defined by positions along said multi-dimensional axes by repetitively generating steering signals to be applied to the driving mechanism, said control unit comprising processing means,
   c) error compensating means for compensating effects of errors in the driving mechanism, which errors cause a deviation between an actual position and the target position, said errors arising due to effects along the multi-dimensional axes from parameters affecting the driving mechanism including load, geometrical, and temperature conditions,
   d) said control unit comprising a source from which said effects of said errors in the driving mechanism are stored and can be retrieved, the control unit processing means being operative for computing error values taking into account the effects of said parameters on the error in positioning of an object along each of the multi-dimensional axes as a function of the object's position along each of the other multi-dimensional axes and storing same in the source,
   e) said control unit being integrated with said error compensating means and being operative to access said source during at least a substantial fraction of the repetitions of generating the steering signals and for retrieving from said source during each access the error values and using those error values in generating the steering signals that are applied to the driving mechanism.

2. Apparatus according to claim 1, characterised in that said source comprises error values indicating the effects in the momentary state of the apparatus, and is arranged for updating these error values at regular intervals.

3. The apparatus according to claim 1, wherein the multi-dimensional axes comprises translational and rotational axes.

4. Apparatus according to claim 1, characterised in that it comprises sensor means for determining a state value or a plurality of state values representative of a state of the apparatus and calculation means for deriving from said state value or state values the error values, in accordance with a mathematical model of the apparatus.

5. Apparatus according to claim 4, wherein the sensor means is arranged for measuring the temperature in the apparatus and/or for measuring the load applied to the apparatus.

6. Apparatus according to claim 2, characterised in that the control unit comprises position determining means with sensors for measuring the position of the object.

7. Apparatus according to claim 2, characterised in that the control unit comprises position determining means arranged for deriving, from the steering signals applied to the driving mechanism, the position of the object.

8. Apparatus according to claim 4, wherein the driving mechanism comprises a plurality of axes for movement of the object in various directions and orientations, characterised in that calculation means for determining error values is arranged for determining, in accordance with a mathematical model, a parameterisation of the error values as a function of the position and orientation of the object for each of the axes of the apparatus, and in that said error values are stored in the control unit in tables that each are dependent of the position along only one axis.

9. Control unit for control of an apparatus according to claim 1, the control unit being arranged for controlling the movement of said object to a target position by repetitively generating steering signals to be applied to the driving mechanism, and comprising error compensating means for compensating effects of errors in the driving mechanism which errors cause a deviation between an actual position and the target position, characterised in that it further comprises a source from which said effects of said errors in the driving mechanism are available, and in that said control unit and said error compensating means are functionally integrated such that the control unit is arranged for accessing said source during each repetition of generating steering signals, or at least a substantial fraction of such repetitions, and that said effects are taken into account while generating steering signals.

10. The apparatus according to claim 1, wherein the source comprises a table for storing the error values.

* * * * *